United States Patent
Shen

(10) Patent No.: US 7,698,973 B2
(45) Date of Patent: Apr. 20, 2010

(54) MACHINE WITH SPINDLE AND FIXTURE COAXIALLY ALIGNED WITH THE SPINDLE

(75) Inventor: Hung-Tsan Shen, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/327,898

(22) Filed: Dec. 4, 2008

(65) Prior Publication Data
US 2009/0290950 A1    Nov. 26, 2009

(30) Foreign Application Priority Data
May 20, 2008    (CN)    ......... 2008 1 0301674

(51) Int. Cl.
*B23C 3/00*    (2006.01)
*B23C 9/00*    (2006.01)

(52) U.S. Cl. .................................. 82/150; 82/151

(58) Field of Classification Search .......... 82/150, 82/151, 903; 279/133, 7, 3; 409/231; 451/63, 451/289
See application file for complete search history.

(56) References Cited

U.S. PATENT DOCUMENTS

| | | | | |
|---|---|---|---|---|
| 1,744,313 | A * | 1/1930 | Kadow | 279/3 |
| 2,852,264 | A * | 9/1958 | Granata | 279/3 |
| 5,159,374 | A * | 10/1992 | Groshong | 396/609 |
| 6,027,401 | A * | 2/2000 | Saito et al. | 451/398 |
| 6,056,632 | A * | 5/2000 | Mitchel et al. | 451/288 |
| 6,309,290 | B1 * | 10/2001 | Wang et al. | 451/398 |
| 6,767,018 | B1 * | 7/2004 | Daniels et al. | 279/3 |
| 2001/0007810 | A1 * | 7/2001 | Moloney et al. | 451/72 |

* cited by examiner

*Primary Examiner*—Will Fridie, Jr.
(74) *Attorney, Agent, or Firm*—Clifford O. Chi

(57) ABSTRACT

A machine includes a spindle for rotating about a rotating axis, a fixture having a central axis coaxial with the rotating axis, a connecting bar and a vacuum pump. The spindle has a first end surface, an opposite second end surface and a plurality of through holes extending through the first and second end surfaces. The connecting bar is detachably interconnected between the fixture and the spindle. The fixture is configured for rotating jointly with the spindle. The vacuum pump is in communication with the through holes.

9 Claims, 4 Drawing Sheets

MACHINE WITH SPINDLE AND FIXTURE COAXIALLY ALIGNED WITH THE SPINDLE

BACKGROUND

1. Technical Field

The present invention generally relates to high precision machines, and particularly relates to a machine having a spindle and a fixture coaxially aligned with the spindle.

2. Discussion of Related Art

Prior to processing a workpiece with a machine tool, the workpiece need being fixed to a spindle of the machine tool. Usually, a fixture for fixing the workpiece is employed to help the fixing process. For most of machine processes, it is required to center the fixture on the spindle of the machine tool. A typical method for centering the fixture on the spindle includes following steps. Firstly, the fixture is sucked onto a surface of the spindle using a vacuum suction device (e.g., a vacuum pump). Secondly, whether the fixture is coaxial to the spindle is checked using a checking device, and the fixture is simultaneously beaten using a hammer until the checking device shows that the fixture is coaxial to the spindle.

However, in such a centering process, the fixture is inevitably damaged, and the centering process is time-consuming.

What is needed, therefore, is a machine to improve an efficiency of the centering process.

SUMMARY

A machine includes a spindle for rotating about a rotating axis, a fixture having a central axis coaxial with the rotating axis, a connecting bar and a vacuum pump. The spindle has a first end surface, an opposite second end surface and a plurality of through holes extending through the first and second end surfaces. The connecting bar is detachably interconnected between the fixture and the spindle. The fixture is configured for rotating jointly with the spindle. The vacuum pump is in communication with the through holes.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION OF EMBODIMENTS

Figure 1:
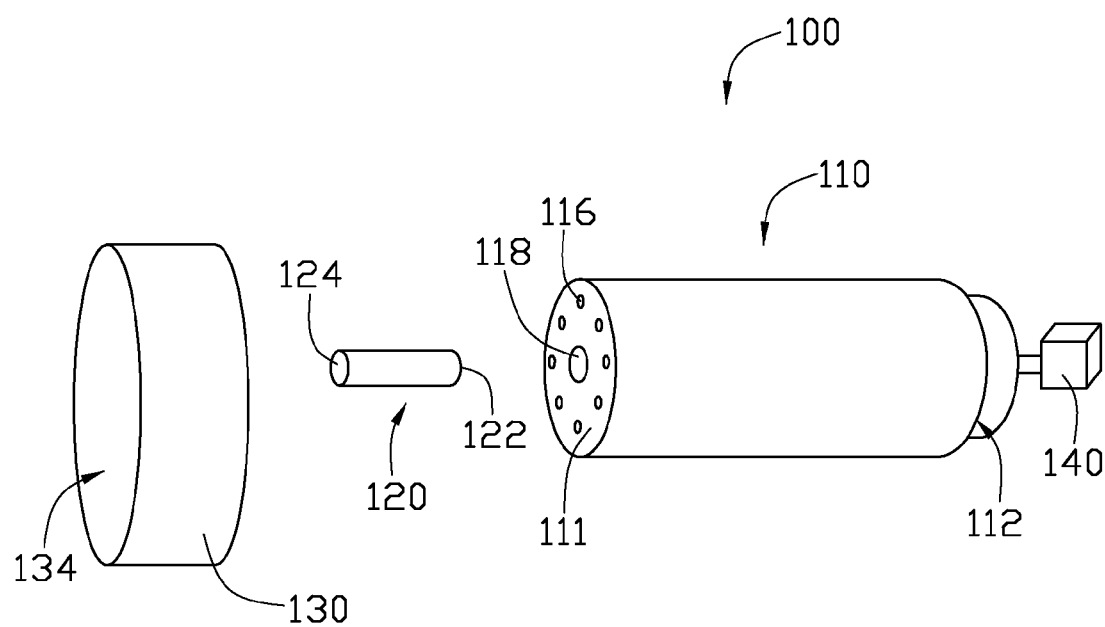
FIG. 1 is an exploded, isometric view of a machine according to a first exemplary embodiment.
Figure 2:
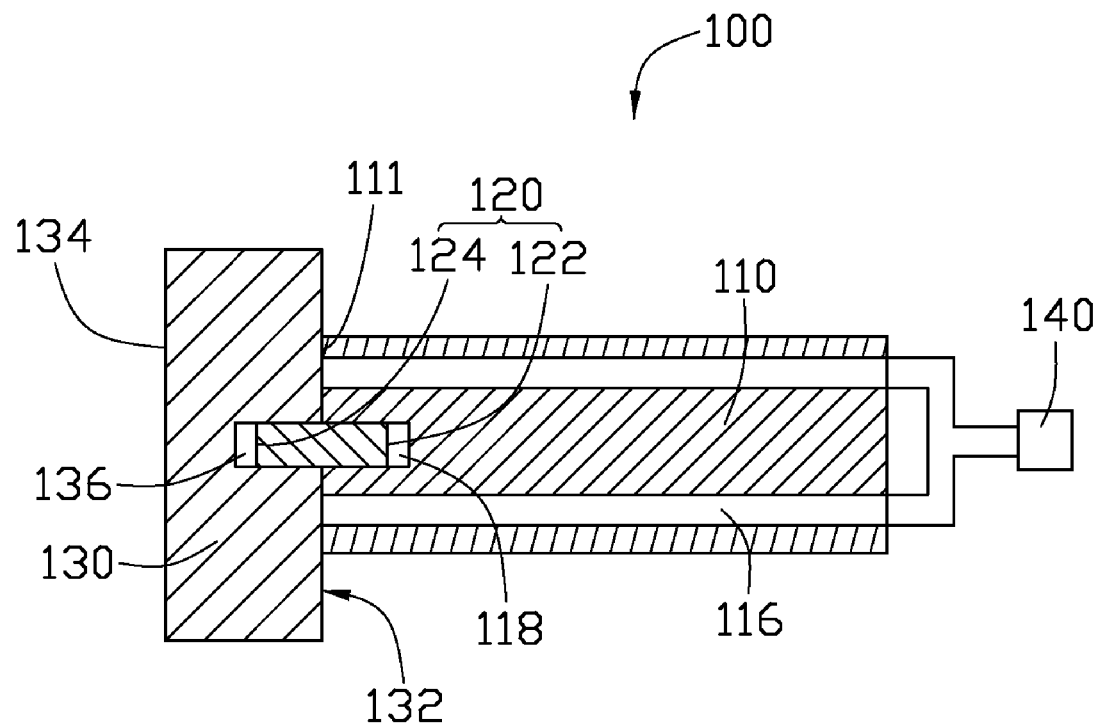
FIG. 2 is a cross-sectional view of the machine shown in FIG. 1.

Referring to FIGS. 1, 2, a machine 100 provided in a first embodiment includes a fixture 130, a spindle 110 of a machine tool, a centering bar 120, and a vacuum pump 140.

The fixture 130 has a supporting surface 134 and an opposite connecting surface 132, which is configured for fixing a workpiece to be processed with the machine tool (not shown) and rotating jointly with the spindle 110. The fixture 130 defines a first receiving hole 136 for receiving an end portion of the centering bar 120. The first receiving hole 136 is symmetrical in shape, and is coaxial to the fixture 130. In the present embodiment, the first receiving hole 136 is cylindrical shaped.

The cylinder-shaped spindle 110 is connected with a driver (not shown), and can rotate about a rotating axis thereof. The spindle 110 has a first end surface 111 and an opposite second end surface 112. The first end surface 111 is in contact with the connecting surface 132. The spindle 110 defines a plurality of through holes 116 extending through the first end surface 111 to the second end surfaces 112, and a second receiving hole 118 corresponding to the first receiving hole 136. The second receiving hole 118 is symmetrical in shape, and is coaxial with the rotating axis of the spindle 110. In the present embodiment, the second receiving hole 118 is cylinder-shaped.

The centering bar 120 has a first end portion 124 and an opposite second end portion 122, which is detachably interconnected between the fixture 130 and the spindle 110. In detail, the first end portion 124 is detachably received in the first receiving hole 136, and the second end portion 122 is detachably received in the second receiving hole 118.

The vacuum pump 140 is communicated with the through holes 116, and is configured for pumping out air in the through holes 116 to firmly sucked the fixture 130 onto the first end surface 111.

In the present embodiment, the first receiving hole 136 is coaxial to the fixture 130, and the second receiving hole 118 is coaxial to the rotating axis of the spindle 110. As such, when the first and second end portions 124, 122 are respectively received in the second receiving hole 118 and the first receiving hole 136, the fixture 130 is coaxial to the rotating axis of the spindle 110. Thus, it is not necessary to further center the fixture 130 on the spindle 110.

Figure 3:
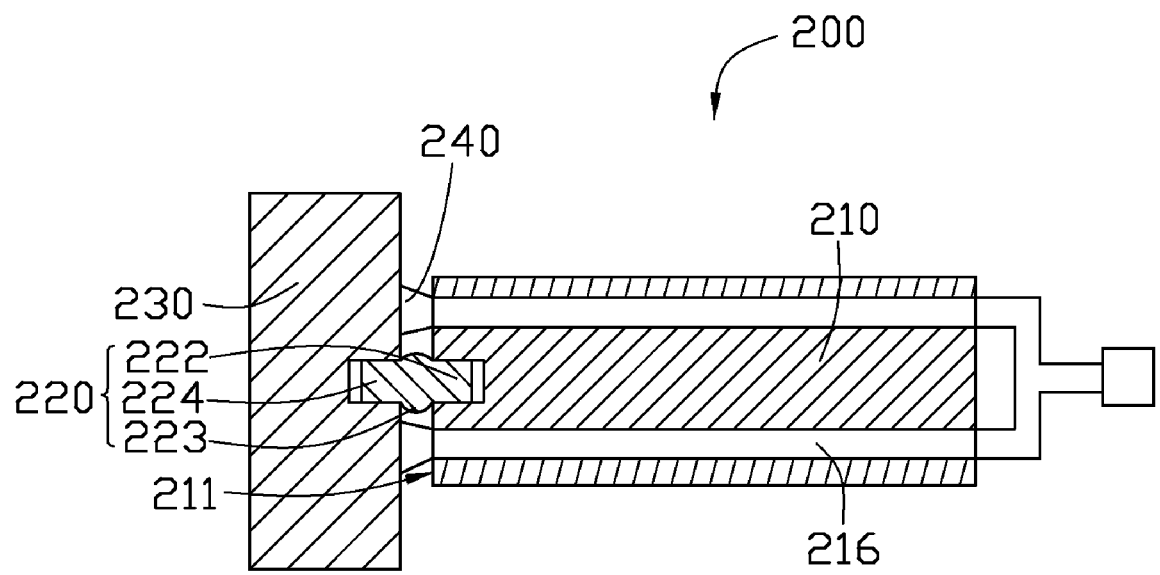
FIG. 3 is a cross-sectional view of a position apparatus according to a second exemplary embodiment.

Referring to FIG. 3, a machine 200 provided in a second exemplary embodiment is similar to the machine 100, but further includes a plurality of suction nozzles 240 fixed on the first end surface 211 of the spindle 210. The suction nozzle 240 is configured for improving the suction force onto the fixture 230, and each of the suction nozzles 240 is communicated with a corresponding through hole 216. The centering bar 220 includes two cylinder-shaped end portions 222, 224 and an unsymmetrical intermediating portion 223.

Figure 4:
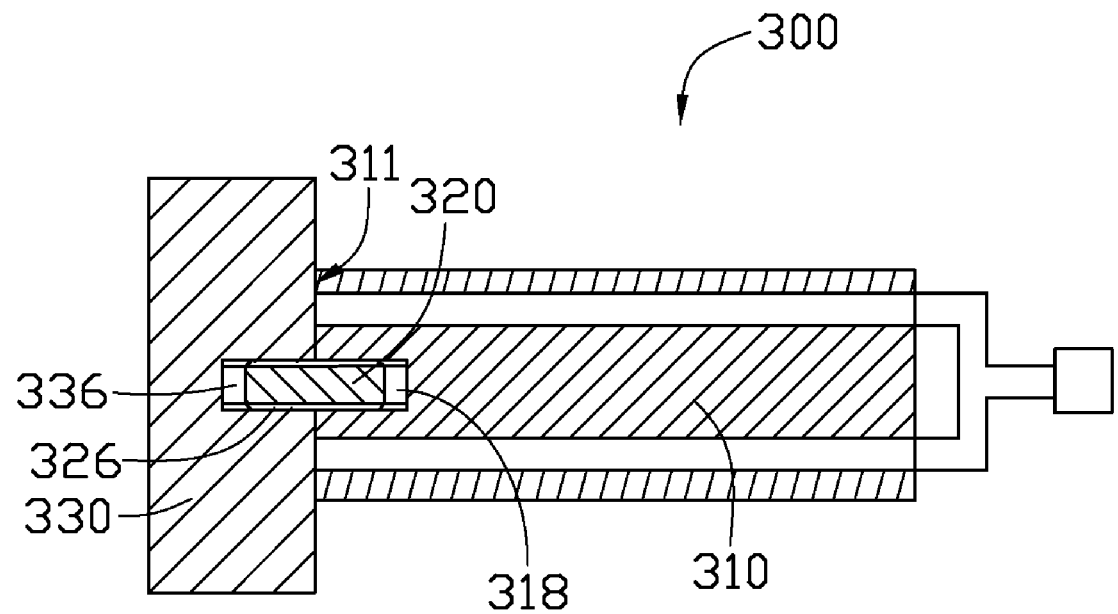
FIG. 4 is a cross-sectional view of a position apparatus according to a third exemplary embodiment.

Referring to FIG. 4, a machine 300 provided in a third exemplary embodiment is similar to the machine 100 except that the first, second receiving holes 336, 318 are screw holes, and the centering bar 320 also defines a plurality of screw threads 326 mated with the first and second receiving holes 336, 318. The centering bar 320 is screwed in the first receiving hole 336 and the second receiving hole 318. Thus, the fixture 330 is fixed more firmly on the second end surface 311 of the spindle 310.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A machine, comprising:
    a spindle for rotating about a rotating axis, the spindle having a first end surface, an opposite second end surface, and a plurality of through holes extending through the first and second end surfaces;
    a fixture having a central axis coaxial with the rotating axis;

a connecting bar detachably interconnected between the fixture and the spindle, the fixture configured for rotating jointly with the spindle;

a vacuum pump in communication with the through holes; and a plurality of suction nozzles arranged between the fixture and the first end surface of the spindle for sucking and holding the fixture, wherein the suction nozzles are in communication with the corresponding through holes and are in contact with the fixture.

2. The machine as claimed in claim 1, wherein the connecting bar is threadedly engaged with the spindle and the fixture.

3. The machine as claimed in claim 1, wherein the fixture is symmetrically shaped.

4. The machine as claimed in claim 1, wherein the connecting bar is aligned with the rotating axis.

5. A machine, comprising:

a spindle for rotating about a rotating axis, the spindle having a first end surface, an opposite second end surface and a plurality of through holes spanning between the first and second end surfaces;

a fixture having a central axis coaxial with the rotating axis;

a connecting bar detachably interconnected between the fixture and the spindle, the fixture configured for fixing a workpiece to be processed and rotating jointly with the spindle; and a vacuum pump in communication with the through holes.

6. The machine as claimed in claim 5, wherein the connecting-bar is threadedly engaged with the spindle and the fixture.

7. The machine as claimed in claim 5, wherein the fixture is symmetrically shaped.

8. The machine as claimed in claim 5, further comprising a plurality of suction nozzles arranged between the fixture and the first end surface of the spindle for sucking and holding the fixture, the suction nozzles being in communication with the corresponding through holes.

9. The machine as claimed in claim 5, wherein the connecting bar is aligned with the rotating axis.

* * * * *